(12) United States Patent
 Armbrust (10) Patent No.: US 10,946,550 B2
(45) Date of Patent: Mar. 16, 2021

(54) METHOD FOR PRODUCING A ROOF TILE HAVING A WATER BARRIER AND ROOF TILE HAVING A WATER BARRIER SHAPED THEREON

(71) Applicant: Monier Roofing GmbH, Oberursel (DE)

(72) Inventor: Jürgen Armbrust, Frankfurt am Main (DE)

( * ) Notice: Subject to any disclaimer, the term of this patent is extended or adjusted under 35 U.S.C. 154(b) by 56 days.

(21) Appl. No.: 15/752,066

(22) PCT Filed: Aug. 5, 2016

(86) PCT No.: PCT/EP2016/068735
 § 371 (c)(1),
 (2) Date: Feb. 12, 2018

(87) PCT Pub. No.: WO2017/025455
 PCT Pub. Date: Feb. 16, 2017

(65) Prior Publication Data
 US 2018/0236689 A1  Aug. 23, 2018

(30) Foreign Application Priority Data

Aug. 12, 2015 (DE) .................... 10 2015 113 328.8

(51) Int. Cl.
 *B28B 11/00* (2006.01)
 *E04D 1/04* (2006.01)
 *B29C 53/02* (2006.01)

(52) U.S. Cl.
 CPC ............ *B28B 11/003* (2013.01); *B29C 53/02* (2013.01); *E04D 1/04* (2013.01)

(58) Field of Classification Search
 None
 See application file for complete search history.

(56) References Cited

U.S. PATENT DOCUMENTS 2,644,217 A * 7/1953 Agar .................... B28B 11/003
                                                264/148
3,606,652 A   9/1971 Hammond
(Continued)

FOREIGN PATENT DOCUMENTS

CN          2148796 Y   12/1993
CN       101137473 A    3/2008
(Continued)

OTHER PUBLICATIONS

CN105332497, abstract and description; teaches using a mold release/separator (Year: 2016).*
(Continued)

*Primary Examiner* — Edmund H Lee
(74) *Attorney, Agent, or Firm* — Ostrolenk Faber LLP (57) ABSTRACT

A method for producing a roof tile having a water barrier, wherein the water barrier is shaped onto a roof tile blank, which is supplied onto a lower mould, of a shaping unit, with a shaped piece and a shaping stamp that can move in relation to same. The shaped piece is placed on an upper side of a top end of the roof tile blank, and the shaping stamp is pressed against the top end of the roof tile blank, such that material of the roof tile blank is pressed into a shaping mould of the shaped piece. The roof tile blank is also arranged below the shaping unit and the shaping unit is vertically lowered onto the roof tile blank. The invention also relates to a roof tile produced according to this method having a water barrier shaped thereon.

10 Claims, 4 Drawing Sheets

(56) References Cited

U.S. PATENT DOCUMENTS

| | | | |
|---|---|---|---|
| 7,947,209 B2* | 5/2011 | Srostlik | E04D 1/04 264/297.9 |
| 8,734,897 B2* | 5/2014 | Palazzolo | C04B 41/009 427/207.1 |
| 2016/0237686 A1* | 8/2016 | Imagawa | B28B 1/52 |

FOREIGN PATENT DOCUMENTS

| | | |
|---|---|---|
| CN | 104032930 * | 9/2014 |
| DE | 279528 | 6/1912 |
| DE | 18 12 456 | 8/1969 |
| DE | 22 52 047 C3 | 5/1973 |
| DE | 35 22 846 A1 | 1/1987 |
| DE | 10-2005-050657 B3 | 1/2007 |
| EP | 1 855 856 B1 | 5/2015 |
| GB | 664010 | 1/1952 |
| GB | 707172 | 4/1954 |
| JP | S57-126614 | 8/1982 |
| JP | S61-56418 | 4/1986 |

OTHER PUBLICATIONS

International Search Report dated Nov. 18, 2016 in corresponding PCT International Application No. PCT/EP2016/068735.
Written Opinion dated Nov. 18, 2016 in corresponding PCT International Application No. PCT/EP2016/068735.
Office Action dated Jun. 30, 2016 in corresponding German Application No. 102015113328.8.
Office Action dated Apr. 12, 2019 in corresponding Chinese Application No. 201680047013.1.
Office Action dated Dec. 11, 2019 in corresponding Chinese Application No. 201680047013.1.
Building Construction Manual, vol. 2, dated Jun. 30, 1981, pp. 335-337.

* cited by examiner

METHOD FOR PRODUCING A ROOF TILE HAVING A WATER BARRIER AND ROOF TILE HAVING A WATER BARRIER SHAPED THEREON

CROSS-REFERENCE TO RELATED APPLICATIONS

The present application is a 35 U.S.C. §§ 371 national phase conversion of PCT/EP2016/068735, filed Aug. 5, 2016, which claims priority to German Patent Application No. 10 2015 113 328.8, filed Aug. 12, 2015, the contents of both of which are incorporated herein by reference. The PCT International Application was published in the German language.

TECHNICAL FIELD

The invention relates to a method for producing a roof tile having a water barrier, and to a roof tile with a water barrier shaped thereon.

BACKGROUND OF THE INVENTION

Roof tiles with water barriers are particularly suitable for use on low-pitch roofs. Laying conventional roof tiles on roofs with a pitch of less than 22° causes problems as the measurement of the roof tile overlap is dependent on the roof pitch. An overlap of roof tiles, laid from eave to ridge, is necessary in order to prevent an ingress of water, in the form of, for example, driving rain. In addition, the thickness of the overlap correlates with the roof pitch. If the pitch is steep, a small overlap is possible, whereas if the pitch is low, it is necessary to have a strong overlap of roof tiles without a water barrier. On account of this, the structure of the roof battens has to be adapted correspondingly to the overlap. This, as well as the high number of roof tiles required with a strong overlap, increase the material and working costs considerably. In addition, the inherent weight of the roof structure with strongly overlapping roof tiles is already heavy, as a result of which further structural measures have to be observed. This problem of the strong overlap with a low pitch roof is overcome by means of water barriers.

Various methods for attaching a water barrier to a roof tile are known. In this case, the roof tile, or the roof tile blank, is preformed in the majority of cases from fresh concrete. A fresh concrete layer is applied by means of extrusion technology as an endless strip to lower molds of identical length, which are arranged side by side. The surface contour of the roof tile is predetermined by molds as early as in said first production steps. The strand is then cut into sub-units in a cutting station such that each lower mold bears an individual roof tile blank. The production of roof tiles from concrete using extrusion technology is described in documents DE 3522 846 A1 and DE 22 52 047 C3.

The water barrier is then attached to the roof tile blank, said water barrier frequently being inserted as a separate component. In this case, the water barrier can consist of the same material as the roof tile, which is shown, for example, in DE 000 00 18 12 456 A1 or of a material that deviates from the roof tile, as is the case in DE 10 2005 050 657 B3. The water barriers are each pressed as a separate component into the still fresh concrete of the roof tile. The robustness necessary for the functioning of the water barrier is obtained once the fresh concrete has dried.

In this connection, it is disadvantageous that roof tile and water barrier have to be produced individually and cannot be joined together until a further operating step. The connection between the two parts comprises weak points. Leaks can occur between the two components during production, as a result of which water can enter the connecting point or even the roof. If the water that has penetrated the spaces freezes, frost wedging can occur and consequently the connection, the water barrier and/or the roof tile can be damaged. In addition, the different materials of roof tile and water barrier used in the second example comprise inconsistent material characteristics. A differentiating heat expansion coefficient, when heating the roof surface, results in stresses between water barrier and roof tile which can then lead to a break in the connection. In addition, said roof tiles have a heterogeneous visual appearance. In the case of a connecting surface coating, the color of the water barrier can also deviate from the rest of the roof tile as the materials have different surface characteristics.

Another variant of the production of a roof tile with a water barrier is described in EP 18 55 856 B1. According to said patent, the water barrier is realized from the material of the roof tile blank, a shaped piece being arranged in the region of the watercourses on the top surface of the head end of the roof tile blank and a movable shaping stamp penetrating into the rear edge of the roof tile blank and pressing the still fresh concrete upward into a mold recess of the shaped piece. Two different methods are proposed for this. On the one hand, the roof tile blank is lifted and thus is moved from below to the shaping unit produced from a shaped piece and shaping punch. On the other hand, multiple shaping units are placed on a conveyor belt at a tilted angle to the roof tile blanks located on a belt conveyor. The water barrier is then realized with the shaping unit and the roof tile blank moving constantly together.

The disadvantage of both variants in EP 18 55 856 B1 is that it is not possible to align the roof tile blank with respect to the shaping unit, or correspondingly the other way around, in a precise manner. As a result, the shaping stamp has to be guided at a relatively large distance from the bottom edge of the roof tile blank, or from the top edge of the lower mold, and a residual proportion of concrete, a so-called grout, remains. If no corresponding distance was ensured between stamp and lower mold, the two components would probably collide. The residual grout results in the entire amount of fresh concrete available not being utilized. In addition, the narrow grout harbors the risk of breaking up in an irregular manner, as a result of which the roof tile comprises a defective appearance and is deemed to be damaged by the consumer. This clearly reduces the quality of the roof tile. In addition, it has been shown that the described methods are not sufficiently economical. The lifting of the roof tile blank into the processing position in the first described method thus limits the production rate to a few roof tiles per minute. In the second method, a higher production rate is possible, however multiple shaping units are required on a conveyor belt here which increases the machine acquisition costs. In addition, it is problematic, in this connection, that a high production rate hardly provides any time for cleaning the individual shaping units. Insufficient cleaning leads to a layer build-up in the mold recess and consequently to incomplete shaping of the water barrier. If the height of the water barrier is unsatisfactory, water can ingress into the roof and if the thickness is insufficient, the water barrier can break up under mechanical load. To eliminate layer build-up in the mold recess, frequent interruptions in the current production are additionally necessary, as a result of which the production rate is reduced and the services of increased personnel are required.

SUMMARY OF THE INVENTION

It is the object of the invention, consequently, to eliminate the existing disadvantages of the prior art, and to provide a method for producing high quality roof tiles for use on low-pitch roofs. The production of roof tiles with a water barrier shaped thereon is to be able to be carried out in a cost-efficient, economical, reliable and simple manner.

Over and above this, the roof tiles produced by way of the method according to the invention are to be easily stackable in order to enable cost-efficient transport and to facilitate handling for the consumer.

In the case of a method for producing a roof tile having a water barrier, wherein the water barrier is shaped on a roof tile blank which is fed on a lower mold to a shaping unit with a shaped piece and a shaping stamp, which is movable relative to said shaped piece, wherein the shaped piece is placed onto a top surface of a head end of the roof tile blank and the shaping stamp presses against the head end of the roof tile blank, wherein material of the roof tile blank is pressed into a shaping recess of the shaped piece, the invention provides that the roof tile blank is arranged below the shaping unit and the shaping unit is lowered vertically onto the roof tile blank.

The method procedure according to the invention makes it possible for the roof tile blank to be aligned precisely below the shaping unit. As the roof tile blank is stopped below the shaping unit and the shaping does not take place when the roof tile blank is moving, precise alignment below the shaping unit is possible. The shaping unit is then lowered vertically, which is also possible in a precisely aligned manner. In addition, in the case of this method procedure, a clearly higher production rate, compared to the method according to the prior art in which the roof tile blank is lifted, is achievable. It is also only necessary to have one shaping unit, which reduces the system costs in relation to the second variant from EP 18 55 856 B1.

The achievement, as a result of said precise positioning of the roof tile blank below the shaping unit, is that the shaping stamp is moved parallel to the lower mold and to the shaped piece, a bottom surface of the shaping stamp being guided at a height with a bottom side of the roof tile blank. The tip of the shaping stamp can therefore penetrate directly in the separation plane between the top surface of the lower mold and the bottom surface of the roof tile blank. This is designated below as penetration position P of the shaping stamp. As a result of said penetration position, a water barrier can be realized in the region of the watercourses without a grout being created. The volume of concrete left standing in the case of the prior art is now completely available for realizing the water barrier, such that more massive dimensioning of the water barrier and greater compaction of the fresh concrete is obtained. The more massive dimensioning reduces a possible risk of breaking and the increased compaction of the concrete reduces the porosity of the water barrier. As a result of the reduced porosity, less water is able to ingress and the frost resistance of the roof tile is clearly increased.

It is preferred for shaping a high-quality water barrier that a sufficient volume V of fresh concrete is available such that as high a compaction as possible and sufficiently massive dimensioning of the water barrier can be achieved. This is important as the water tightness of the water barrier increases with the compaction of the fresh concrete and the risk of breaking decreases as the dimensioning increases. This is ensured by different parameters in favored regions.

In a preferred embodiment of the method, the shaping stamp is pressed at a penetration depth E of between 10 and 20 mm into the head end of the roof tile blank. In addition, the water barrier is realized at a setting angle $\beta$ of between 60° and 90°. The setting angle $\beta$ is preferably approximately 75°. Said setting angle $\beta$ is determined by the wedge angle $\alpha$ of the shaping stamp. The wedge angle $\alpha$ and the penetration depth E of the shaping stamp should be coordinated with one another such that at the head end of the roof tile a setback with as small a depth T (T=E) as possible is created, but as large a volume V of fresh concrete as possible is nevertheless available. The depth T of the setback of the water barrier is measured from the original head edge of the roof tile blank. The smallest possible depth T, which is determined by the penetration depth E, is important so that the coverage length of the roof tiles is not reduced by an unfavorable positioning of the suspension lug. The suspension lugs serve for fastening the roof tiles on the roof batten structure.

The wedge angle $\alpha$ of the shaping stamp at an inclination of between 60° and 90° is preferred so that when the shaping stamp moves, fresh concrete can be pushed up from the head edge in the direction of the roof tile blank and pressed into the mold recess of the shaped piece. In this case, the wedge effect must be high enough so that a sufficient upward movement of the fresh concrete is obtained and the mold recess is correspondingly filled and compacted. In the case of a larger wedge angle (>90°), the fresh concrete would be pressed downward, as a result of which the bottom surface would be compacted. The mold recess would not be filled with pushed-up concrete, as a result of which no water barrier would be realized. In the case of a wedge angle less than 60°, the shaping stamp has to carry out a very long feed movement so that, with a small amount of wedge action, a sufficient amount of fresh concrete is moved into the mold recess. In this case, not only is the complete filling of the mold recess important, but also a compaction of the material. On account of the large penetration depth of the shaping stamp with a small wedge angle, a deeper recess would be created, as a result of which the suspension lugs on the bottom surface of the roof tile would have to be arranged at a large distance away from the original head edge of the roof tile. The larger said distance M of the suspension lugs, the smaller the coverage length of the roof tile when suspended on the roof battens.

The water barrier must comprise a sufficient height H between the surface of the watercourse and the top surface of the water barrier in the region of the watercourse of the roof tile. So that the wind-related driving of the rainwater in the overlap region can be reliably prevented, the water barrier should comprise at least a height H of 5 mm. If the height H is realized in a smaller manner, there is the risk of flooding the water barrier, as a result of which water would ingress into the roof truss. In order to ensure stackability of the roof tiles additionally, the height of the water barrier on the top surface of a roof tile located in the stack must correspond to no more than a projection height of the suspension lugs on the bottom surface of the roof tile located above in the stack. If the height H of the water barrier is set higher, the roof tiles can no longer be stacked as the top roof tile is then no longer supported as usual by the suspension lug, but by the too-high water barrier of the roof tile lying underneath. The roof tile stack would become lopsided and tip. The height of the water barrier is determined during the production process by means of the shape of the mold recess. In a preferred manner, this results in the mold recess realizing the water barrier with a height of between 5 and 20 mm.

In an alternative configuration of the method according to the invention, it is provided that the mold recess forms the water barrier in a thickness S of between 5 and 15 mm. Roof tiles are handled in the majority of cases at the head end during laying and are often thrown from roofer to roofer such that the water barrier shaped thereon is exposed to high mechanical loads. In order to bestow the water barrier with sufficient robustness, as a result of which a risk of the water barrier breaking is to be minimized, the root thereof, which proceeds from the top surface of the roof tile, must have a thickness S of at least 5 mm. If the thickness S is realized in a lesser manner, not only the robustness suffers but also the water tightness of the water barrier. The thickness S should, however, also not be more than 15 mm, for this would have a negative influence on the positioning of the suspension lugs and, as a result, on the coverage length of the roof tile.

In the case of a preferred further development of the method according to the invention, the top surface of the roof tile blank is provided with a separating means prior to the realization of the water barrier. This prevents fresh concrete sticking and consequently a layer build-up in the mold recess of the shaped piece. Improved shaping accuracy of the water barrier, also over a long period during production, can consequently be ensured. For example, sand, which is inert and cost-efficient, can be used as separating means. After the molding process, the sand particles, of the loose, dry sand, are pressed into the top surface of the roof tile blank, as a result of which the visual appearance is not influenced or is only influenced in a minimal manner. In a variant of the method, the separating means is applied onto the top surface of the head end of the roof tile blanks as a 2 to 5 cm wide strip. Said width of applied separating means ensures that there is no layer build-up in the mold recess without the entire top surface of the roof tile having had to be provided with separating means. As a result, there is a saving in separating means and various application variants are conceivable.

According to a configuration of the method according to the invention, the roof tile blank with the water barrier shaped thereon can be submitted to further processing steps. Thus, the fresh concrete is then dried and hardened. A surface coating and a color coating in order to obtain a visual appearance desired by the consumer are also possible.

The invention additionally relates to a roof tile with a water barrier shaped thereon which has been produced by way of the method described previously, the water barrier and the roof tile being realized in one piece and the water barrier comprising a planar rear side. When the water barrier and the roof tile are realized according to the invention in one piece, the connection between the two does not have any weak points which would result in leakage or weather-related damage. In addition, the planar rear side makes it possible for as large a volume of fresh concrete as possible to be available in order to realize the water barrier. As a result, sufficient material can be deformed for massive dimensioning and high density.

The roof tile, in a preferred embodiment, is characterized in that the water barrier comprises an increased density. This reduces porosity and, as a result, reduces the ingress of water. The robustness in relation to environmental influences is increased compared to the prior art.

In favored embodiments, the roof tile, analogously to the method, comprises preferred shaping parameters. The water barrier should thus comprise a setting angle $\beta$ of between 60° and 90°. In particular, a setting angle $\beta$ of 75° is deemed to be optimum. In addition, it is preferred that the water barrier comprises a thickness S of between 5 and 15 mm, as a result of which sufficient robustness of the water barrier is ensured. The ingress of water into the roof truss and good stackability of the roof tiles is ensured by the roof tile comprising a height of between 5 and 20 mm. So that the water barrier is realized from sufficient fresh concrete, which influences the compaction at this point, and at the same time does not have a negative influence on the coverage length when the roof is tiled, the water barrier should be realized, in the region of the watercourse, with a setback with a depth T, with respect to the head end of the roof tile blank, of between 10 and 20 mm.

In turn, as an option or in addition, it can be provided that at least one suspension lug is realized on the bottom side of the roof tile blank at a minimum distance M from the head end of the roof tile blank. In this case, it is to be preferred for the minimum distance M of the at least one suspension lug to correspond to at least the sum of the depth T of the setback and the thickness S of the water barrier ($M \geq T+S$). This ensures that when the roof tiles are stacked, the water barrier shaped on the top surface of a roof tile does not collide with the suspension lugs on the bottom surface of a roof tile located above in the stack. If the minimum distance M were smaller than the sum of the depth T and the thickness S, water barrier and suspension lugs would be at least in part at the same position. This would result in the roof tile stack being lopsided and perhaps tipping quicker.

BRIEF DESCRIPTION OF THE DRAWINGS

Further features, details and advantages of the invention are produced from the wording of the claims and from the following description of exemplary embodiments by way of the drawings, in which:

DESCRIPTION OF PREFERRED EMBODIMENTS

Figure 1:
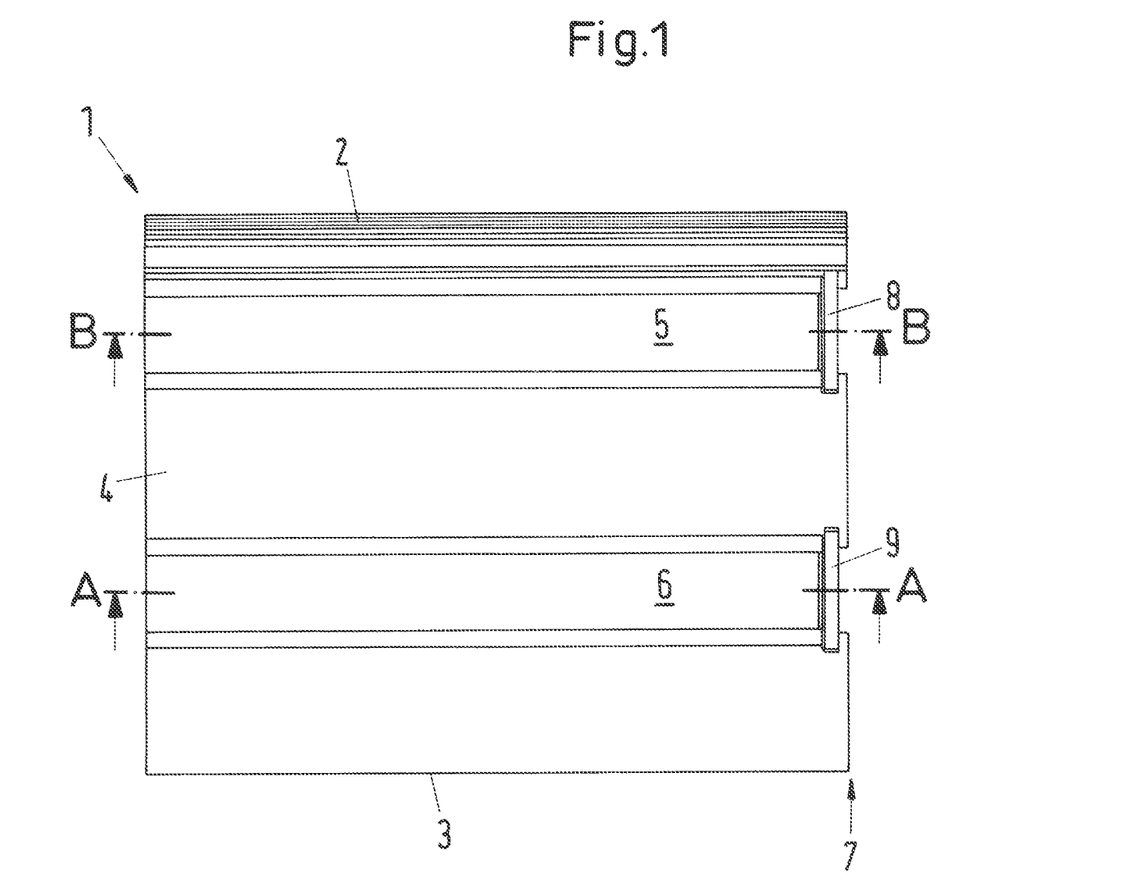
FIG. 1 shows a view of a roof tile according to the invention

FIG. 1 shows a top view of a roof tile 1 according to the invention. The roof tile 1 comprises a water notch 2 and a cover notch 3 on its longitudinal edges as well as a center rim 4 located in between. A watercourse 5, 6 is realized between each of the notches 2, 3 and the center rim 4. A water barrier 8, 9 is realized in each region of the watercourse 5, 6 on a head end 7 of the roof tile 1. In this case, the water barrier 8, 9 extends at least over the region of the watercourse 5, 6. One single water barrier, however, can also extend over the entire length of the head edge 7 of the roof tile 1.

The method for producing a roof tile having a water barrier and the roof tile produced according to said method are explained below by way of FIGS. 2 to 4.

Figure 2:
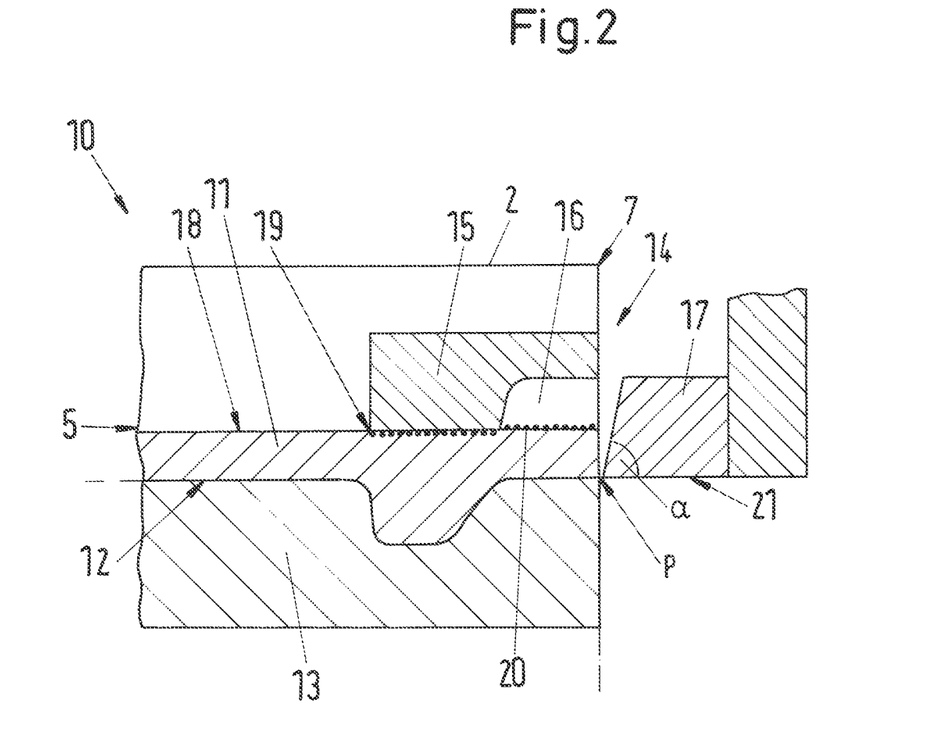
FIG. 2 shows a cross-sectional view of a roof tile blank prior to the shaping thereon of a water barrier
Figure 3:
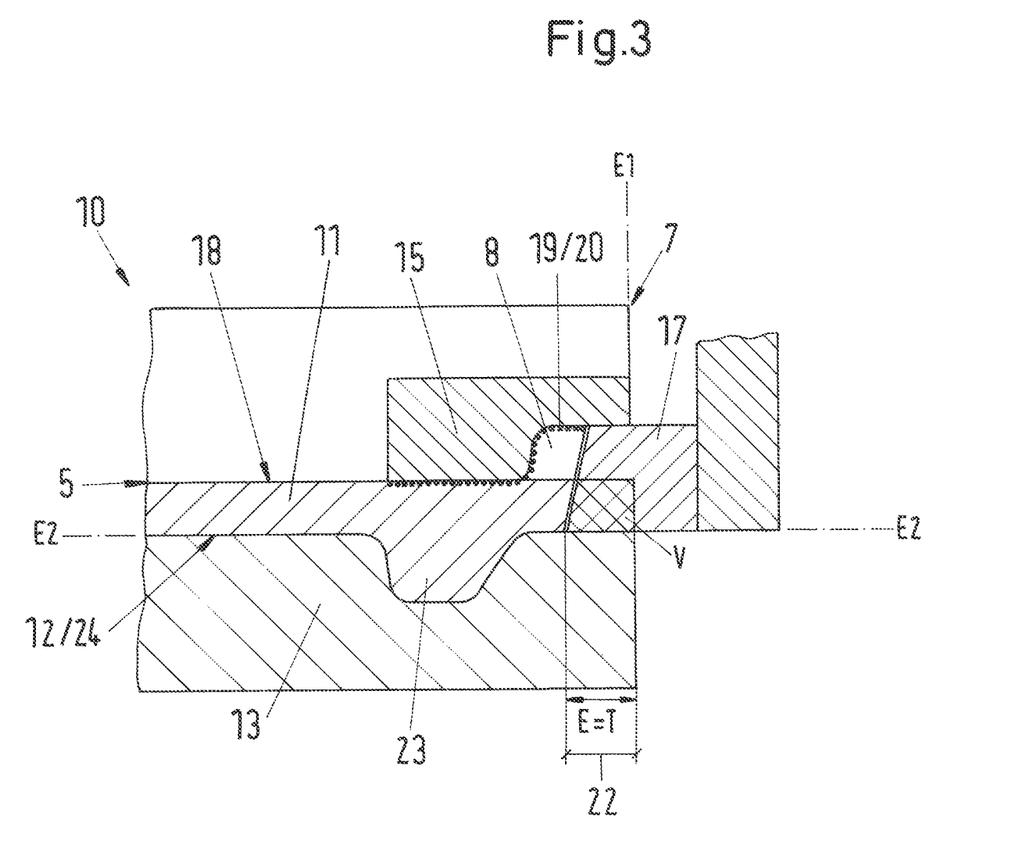
FIG. 3 shows a cross-sectional view of a roof tile blank during the shaping thereon of a water barrier
Figure 4:
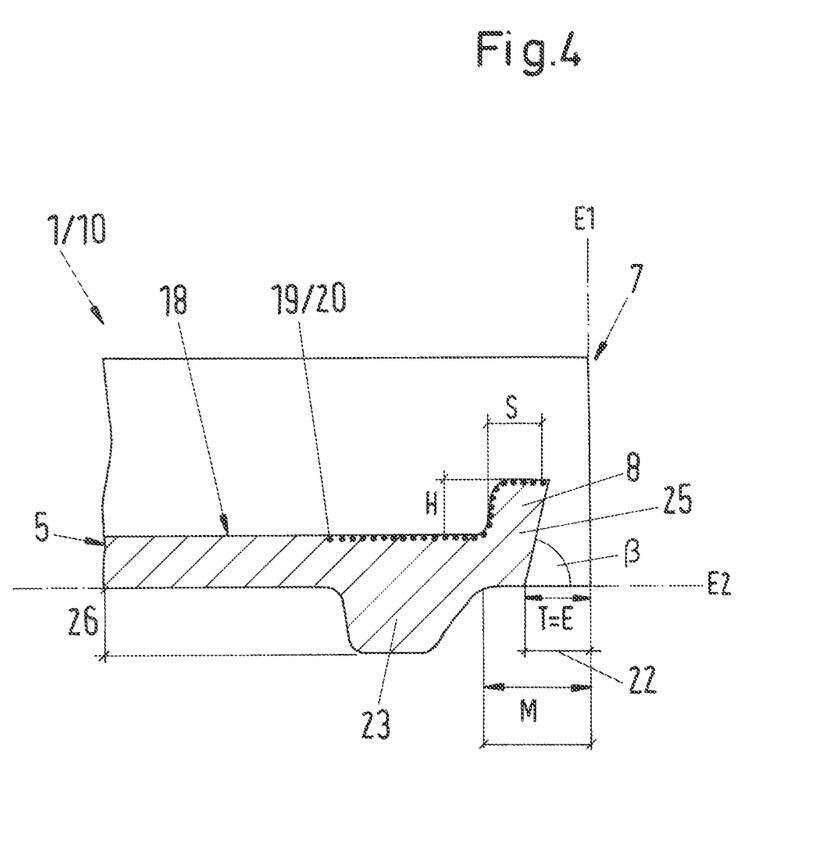
FIG. 4 shows a cross-sectional view of a roof tile according to the invention with a water barrier shaped thereon.

FIGS. 2 to 4 show a longitudinal section B-B of the roof tile 1 or preliminary steps of the roof tile 1 from FIG. 1 in the region of the head edge 7, the longitudinal section running through the watercourse 5.

The shaping of the water barrier 8, 9 is effected at the head end 7 in the region of the watercourse 5 of a roof tile blank 10. The water barrier 8, 9 of the finished roof tile 1 is created from said roof tile blank 10 as a result of being shaped thereon. The roof tile blank 10 produced from fresh concrete 11 rests with its bottom surface 12 on a lower mold 13. After stopping and aligning the roof tile blank 10 below a shaping unit 14, which is formed from a shaped piece 15 with a mold recess 16 and a shaping stamp 17, said shaping unit is lowered vertically. In this case, the lateral one opening of the mold recess 16 is arranged opposite the wedge-shaped shaping stamp 17. As a result of lowering the shaping unit 14, the shaped piece 15 with the mold recess 16, the inner contour of which corresponds to the shape of the water barrier to be produced, rests on a top surface 18 of the roof tile blank 10 close to the head edge 7. The mold recess 16 comprises an L-shaped cross section with rounded corners. In order to prevent the fresh concrete 11 from sticking and consequently a layer build-up in the mold recess 16, prior to placing the shaped piece 15 close to the head edge 7, a separating layer 19 is applied to the top surface 18 of the roof tile blank 10. Said separating layer 19 can preferably consist of a strewn layer of loose, dry sand particles 20 and prevents the fresh concrete 11 sticking in the mold recess 16. The fresh concrete 11 for shaping the water barrier 8 is obtained by the shaping stamp 17, provided with a wedge angle $\alpha$, penetrating into the roof tile blank 10 from the head end 7. In a preferred embodiment, the shaping stamp 17 is moved parallel to the lower mold 13 in a reversing manner, the bottom surface 21 of the shaping stamp 17 being guided at a height with the bottom surface 12 of the roof tile blank. The penetration position is designated by means of the reference P.

When the shaping stamp 17 is advanced further, as shown in FIG. 3, the fresh concrete 11 detaches itself from the lower mold 13 and slides upward along the inclined wedge surface into the mold recess 16, where it is compacted to form the water barrier 8. In this connection, the particles of the separation layer 19, for example sand particles 20, abut against the wall of the mold recess 16 and in this way ensure easy detachment of the formed water barrier 8 from the mold recess 16. After the shaping operation, the sand particles 20 are pressed into the top surface 18 of the roof tile blank 10 or of the water barrier 8 such that they do not appear visually or only appear in a minimum manner. On account of the feed movement of the shaping stamp 17, the head end 7 of the roof tile blank 10 is recessed in relation to a plane E1 in the region of the watercourse 5 or the water barrier 8 arranged there. The plane E1 is formed by the original head end 7. Said setback 22 comprises a depth T, which corresponds to the insertion depth E of the shaping stamp 17, in a plane 2 (E2) which runs through the separation layer between the roof tile blank 10 and the lower mold 13.

For the forming of a high-quality water barrier 8, 9, it is significant that a sufficient volume V (see cross-hatching in FIG. 3) of fresh concrete 11 is available, as a result of which as high a compaction of fresh concrete 11 as possible is able to be obtained. In this case, the water tightness of the water barrier 8, 9 is all the better, the higher the compaction of the fresh concrete 11 in the mold recess 16.

The size of the volume V of fresh concrete 11 available and the compaction thereof is determined substantially by the following tool and method parameters:
 the wedge angle $\alpha$ of the shaping stamp 17
 the penetration depth E of the shaping stamp 17
 the penetration position P of the shaping stamp 17

It is favored that the wedge angle $\alpha$ of the shaping stamp 17 comprises at least 60° and should not exceed 90°. The wedge angle $\alpha$ is preferably approximately 75°. If the wedge angle $\alpha$ is chosen too small, the shaping stamp 17 has to carry out a very long feed movement so that an upward movement of the fresh concrete 11, which is sufficient to fill the mold recess 16 and for compaction, is generated with a small wedge action. In this case, a very deep setback 22 is created at the head end 7 of the roof tile blank 10 on account of the necessary large penetration depth E of the shaping stamp 17, as a result of which the suspension lugs 23 on the bottom surface 12 of the roof tile blank 10 have had to be arranged spaced at a large distance from the plane E1 of the head end 7. The larger said distance M (see FIG. 4), the smaller the possible coverage length of the roof tile 1 when suspended on the roof battens. The disadvantage of a reduction in the coverage length is that more rows of roof tiles running parallel to the eaves have to be laid in the ridge-eave direction. This increases the load on the roof substructure, the material and the operating costs.

The wedge angle $\alpha$ of the shaping stamp 17 and the penetration depth E of the shaping stamp 17 are therefore to be coordinated with one another such that a setback 22 with as small a depth T as possible is created on the roof tile 1 so that, on the one hand, the coverage length of the roof tile 1 is not reduced by an unfavorable positioning of suspension lugs 23 and, on the other hand, nevertheless as large a volume V as possible of fresh concrete 11 is obtained. For obtaining the volume V of fresh concrete 11, it is additionally important to place the penetration position P of the shaping stamp 17 into the separation plane (=E2) between the bottom surface 12 of the roof tile blank 10 and a top surface 24 of the lower mold 13. In this case, no more grout is created at the head end 7 in the region of the watercourse 5, but simply the setback 22. The concrete volume squandered previously to realize the grout is pressed completely into the water barrier 8. As a result, the water barrier 8 can be dimensioned thicker and there is better compaction of the fresh concrete 11 in the region of the water barrier 8.

In summary, the shaping of the water barrier 8, 9 is effected in four operating steps: First of all, the roof tile blank 10 is placed in an accurate position beneath the shaping unit 14, the shaped piece 15 being situated close to the head end 7 of the roof tile blank 10. The shaping unit 14 is movable vertically in the direction of the top surface 18 of the roof tile blank 10 and in the opposite direction. In a first operating step, the shaping unit 14 is lowered in the direction of the top surface 18 of the roof tile blank 10, the shaped piece 15 abutting against the top surface 18 of the roof tile blank 10 and the side opening of the mold recess 16 being arranged on the head end 7. In this connection, at the same time the shaping stamp 17 is lowered such that the tip thereof is positioned in front of the lower mold 13 and at the height of the separation plane between the top surface 24 of the lower mold 13 and the bottom surface 12 of the roof tile blank 10. In the second operating step, the shaping stamp 17 carries out a movement which is effected parallel to the lower mold 13 and directed to the head end of the roof tile blank 30, where the shaping stamp 17 provided with the wedge angle $\alpha$ penetrates into the fresh concrete 11 and presses said fresh concrete into the mold recess 16 of the shaped piece 15. In this connection, the shaping stamp 17 penetrates into the mold recess 16 by the penetration depth E. The pressed fresh concrete 11 fills the mold recess 16 completely such that a roof tile blank 10 is created with a water barrier 8, 9 shaped monolithically thereon. In the third operating step, the shaping stamp 17 is then returned back to its starting position, and in the fourth operating step, the shaping unit 14 is pulled back from the top surface of the roof tile blank 18 such that the shaped piece 15 is removed from the top surface of the roof tile blank 10 and the mold recess 16 releases the water barriers 8, 9 shaped monolithically thereon. Further steps connected to the production method can serve for surface coating, hardening and packaging.

The roof tile blank 10 produced by way of the method according to the invention or the roof tile 1 with the realized water barrier 8 is shown in FIG. 4. The shaping parameters preferred in the method can be seen on the finished roof tile 1. Thus, the water barrier 5 comprises a setting angle β, with reference to the plane E2, which corresponds to the wedge angle α of the shaping stamp 17. In addition, the depth T of the setback 22 corresponds to the penetration depth E of the shaping stamp 17, which should be at least 10 mm and should not exceed 22 mm. The shape of the mold recess 16 provides the shape of the water barrier 8, in particular the height H (H=5 to 20 mm) and the thickness S (S=5 to 15 mm), the thickness S of the water barrier 8 corresponds to the width of a root 25 proceeding from the top surface 18 of the roof tile 1.

In order to ensure the stackability of the roof tiles 1, the water barrier 8 on the top surface 18 of a roof tile 1 lower in the stack should not be positioned in the same position as the suspension lug 23 on the bottom surface 12 of a roof tile 1 above in the stack, for otherwise the stack of roof tiles 1 would become lopsided and tip.

So that, consequently, the collision between the water barrier 8 and the suspension lug 23 is prevented during stacking, the suspension lugs 23 should maintain a minimum distance M from the head end 7 of the roof tile 1, which is produced as follows: M≥depth T of the setback 22+ thickness S of the root 25 of the water barrier 8, 9.

The invention is not restricted to one of the previously described embodiments, but is convertible in diverse ways.

All the features and advantages emanating from the claims, the description and the drawing, including structural details, spatial arrangements and method steps, can be essential to the invention both on their own per se and in the most varied combinations.

LIST OF REFERENCES

1 Roof tile
2 Water notch
3 Cover notch
4 Center rim
5 Watercourse
6 Watercourse
7 Head end
8 Water barrier
9 Water barrier
10 Roof tile blank
11 Fresh concrete
12 Bottom surface
13 Lower mold
14 Shaping unit
15 Shaped piece
16 Mold recess
17 Shaping stamp
18 Top surface
19 Separation layer
20 Sand particle
21 Bottom surface of the shaping stamp 17
22 Setback
23 Suspension lug
24 Top surface of the lower mold 13
25 Root of the water barrier 8, 9
26 Projection height of the suspension lug 23
A-A Cutting plane through the roof tile 1
B-B Cutting plane through the roof tile 1
E Penetration depth of the shaping stamp 17
E1 Plane of the original head edge 7
E2 Separation plane between the lower mold 7 and the roof tile blank 10
H Height of the water barrier 8, 9 and of the mold recess 16
M Minimum distance of the suspension lug 23
P Penetration position of the shaping stamp 17
S Thickness of the root of the water barrier 8, 9 and of the mold recess 16
T Depth of the setback 22
V Volume of fresh concrete 11
α Wedge angle of the shaping stamp 17
β Setting angle of the roof tile blank 10/roof tile 1

The invention claimed is:

1. A method for producing a roof tile having a water barrier, wherein the water barrier is shaped on a roof tile blank, comprising:
    feeding the roof tile blank on a lower mold, to a shaping unit, with a shaped piece and a shaping stamp which is movable relative to said shaped piece,
    placing the shaped piece onto a top surface of a head end of the roof tile blank and moving the shaping stamp parallel to the lower mold and to the shaped piece,
    pressing the shaping stamp against the head end of the roof tile blank such that material of the roof tile blank is pressed into a shaping recess of the shaped piece, the roof tile blank being arranged below the shaping unit and the shaping unit being lowered vertically onto the roof tile blank, the method further comprising:
    providing less than an entire top surface of the roof tile blank with a separator prior to the realization of the water barrier,
    guiding a bottom surface of the shaping stamp to a height with a bottom surface of the roof tile blank, and
    pressing the shaping stamp at a penetration depth E of between 10 and 20 mm into the head end of the roof tile blank,
    wherein the separator is applied onto the top surface of the head end of the roof tile blank as a 2 to 5 cm wide strip.

2. The method for producing a roof tile having a water barrier as claimed in claim 1, wherein the water barrier is realized with a height H of between 5 and 20 mm.

3. The method for producing a roof tile having a water barrier as claimed in claim 1, wherein the water barrier is molded in a thickness S of between 5 and 15 mm.

4. The method for producing a roof tile having a water barrier as claimed in claim 1, wherein the water barrier is realized with a setting angle β of between 60° and 90°.

5. A roof tile having a water barrier shaped thereon which is produced using a method comprising:
    feeding a roof tile blank on a lower mold, to a shaping unit, with a shaped piece and a shaping stamp which is movable relative to said shaped piece,
    placing the shaped piece onto a top surface of a head end of the roof tile blank and moving the shaping stamp parallel to the lower mold and to the shaped piece,
    pressing the shaping stamp against the head end of the roof tile blank such that material of the roof tile blank is pressed into a shaping recess of the shaped piece, the roof tile blank being arranged below the shaping unit and the shaping unit being lowered vertically onto the roof tile blank, providing the top surface of the roof tile blank with a separator prior to the realization of the water barrier, guiding a bottom surface of the shaping stamp to a height with a bottom surface of the roof tile blank, pressing the shaping stamp at a penetration depth E of between 10 and 20 mm into the head end of the roof tile blank, realizing the water barrier and the roof tile in one piece and the water barrier comprising a planar rear side, and indenting the water barrier at a depth T of between 10 and 20 mm with respect to the head end of the roof tile blank with and at least one suspension lug being realized on the bottom surface of the roof tile blank at a minimum distance M from the head end of the roof tile blank, wherein the minimum distance M corresponds to at least the sum of the depth T of the setback and the thickness S of the water barrier (M >T+S).

6. The roof tile having a water barrier shaped thereon as claimed in claim 5, wherein the water barrier comprises an increased density.

7. The roof tile having a water barrier shaped thereon as claimed in claim 5, wherein the water barrier comprises a setting angle β of between 60° and 90°.

8. The roof tile having a water barrier shaped thereon as claimed in claim 5, wherein the water barrier comprises a thickness S of between 5 and 15 mm.

9. The roof tile having a water barrier shaped thereon as claimed in claim 5, wherein the water barrier comprises a height H of between 5 and 20 mm.

10. The method for producing a roof tile having a water barrier as claim in claim 4, wherein said setting angle β is 75°.

* * * * *